(12) United States Patent
Sanocki

(10) Patent No.: US 6,796,798 B1
(45) Date of Patent: Sep. 28, 2004

(54) DYNAMIC READING INSTRUCTION

(75) Inventor: Thomas Sanocki, Lutz, FL (US)

(73) Assignee: University of South Florida, Tampa, FL (US)

( * ) Notice: Subject to any disclaimer, the term of this patent is extended or adjusted under 35 U.S.C. 154(b) by 0 days.

(21) Appl. No.: 10/249,268

(22) Filed: Mar. 27, 2003

Related U.S. Application Data

(60) Provisional application No. 60/319,156, filed on Mar. 27, 2002.

(51) Int. Cl.[7] .............................................. G09B 19/00
(52) U.S. Cl. ...................... 434/156; 434/157; 434/167; 434/169; 434/178; 434/185
(58) Field of Search ................................ 434/112, 116, 434/156–185

(56) References Cited

U.S. PATENT DOCUMENTS

| | | | | |
|---|---|---|---|---|
| 3,365,198 A | * | 1/1968 | Hay | 273/157 R |
| 3,426,451 A | * | 2/1969 | Hoffman | 434/178 |
| 3,715,812 A | * | 2/1973 | Novak | 434/170 |
| 4,126,447 A | * | 11/1978 | Costello et al. | 420/584.1 |
| 4,193,212 A | * | 3/1980 | Al-Kufaishi | 434/178 |
| 4,299,577 A | | 11/1981 | Marryman | |
| 4,315,748 A | * | 2/1982 | Frascara et al. | 434/159 |
| 4,609,357 A | * | 9/1986 | Clegg | 434/167 |
| 4,650,423 A | * | 3/1987 | Sprague et al. | 434/156 |
| 4,655,713 A | * | 4/1987 | Weiss | 434/178 |
| 5,188,533 A | * | 2/1993 | Wood | 434/169 |
| 5,328,373 A | | 7/1994 | Wood | |
| 5,429,513 A | * | 7/1995 | Diaz-Plaza | 434/167 |
| 5,897,421 A | * | 4/1999 | Rink et al. | 446/369 |
| 6,474,992 B2 | * | 11/2002 | Marshall | 434/167 |
| 6,491,524 B2 | * | 12/2002 | Bender | 434/159 |

OTHER PUBLICATIONS

Sanocki et al.; Modifiable Letterforms for Teaching Reading: The Graphophonic Alphabet; J. Educational Technology Systems; vol. 18(3), p. 173–183, 1989–1990.
Willows et al.; Visual Processes in Reading and Reading Disabilities; 1993.

* cited by examiner

*Primary Examiner*—John Edmund Rovnak
(74) *Attorney, Agent, or Firm*—Smith & Hopen P.A.; Anton J. Hopen; Molly L. Sauter

(57) ABSTRACT

The present invention is a method of associating visual symbols with verbal expression including the steps of preselecting a language having both verbal and written expressions, establishing an array of sounds employed in the verbal expression of the language, assembling an array of symbols correlating to the first array of sounds according to the language, associating a mechanical physiologic cue with each sound in the array of sounds, and animating the array of symbols according to the mechanical physiologic cues.

18 Claims, 9 Drawing Sheets

Fig. 14

| Letter/Sound | Cue | Silent Letters |
|---|---|---|
| long a | longer (horizontally) | Grayed. They lean back during animation |
| short a | shorter (& taller) | |
| b | lips opening | Digraphs |
| | | Digraphs have one puff of air (one sound) and are linked by blue link |
| hard c | throat closure | th |
| soft c | tongue & palate | ng |
| d | tongue & palate | sh |
| long e | longer | ch |
| short e | shorter | |
| f | teeth & lip | |
| hard g | throat closure | |
| soft g | tongue & palate | Vowel Digraphs |
| | | oo (food) |
| h | mouth opening | oo (good) |
| | | Further vowel distinctions are omitted for most students |
| long I | longer | |
| short I | shorter | |
| j | tongue & palate | |
| k | throat closure | |
| m | vibration, lips | . |
| n | vibration, tongue | |
| long o | longer | |

Fig. 15

| short o | shorter | |
|---|---|---|
| p | lips opening | |
| q | throat closure | |
| r | low tongue, mouth open | |
| soft s | tongue & palate | |
| hard s | vibration | |
| t | lips & palate | |
| long u | longer | |
| short u | shorter | |
| v | teeth, lip, vibration | |
| w | lips & palate, lips, lips open | |
| x (z) | lips & palate | |
| x (k) | lips & palate | |
| y (yell) | lips & palate | |
| y (city) | opening | |
| z | lips & palate | |

DYNAMIC READING INSTRUCTION

RELATED APPLICATIONS

This application claims priority to Ser. No. 60/319,156, filed Mar. 27, 2002, for "Dynamic Alphabet for Teaching Reading and Second Language."

BACKGROUND OF INVENTION

1. Field of Invention

This invention relates to the teaching of reading, and more particularly to the association of visual symbols with mechanisms of speech production.

2. Background of the Invention

An inherent source of difficulty in learning to read is the language itself. Any alphabetic language will be difficult for beginners because the alphabetic principle that arbitrary symbols represent bits of sound is difficult to acquire. In English, the problem is compounded by the many ambiguities and inconsistencies that have resulted from the long and complex history of the language. A logical response to the difficulties of the English language is to create a modified alphabet for beginning readers. A number of minor modifications have been proposed such as colored words, diacritical markings and the like. However, these modifications involve additions that attract the child's attention away from the actual form of the letters and words. This may be one reason that these modifications have not been widely adopted.

One major modification of the alphabet did become widely used the Initial Teaching Alphabet, or I.T.A. The I.T.A. utilizes 44 symbols, each of which is intended to represent a single sound. Some of the symbols used are identical to the letters of the alphabet; however, many symbols are unique to I.T.A. While I.T.A has proved useful, there are inherent problems with the method. Although children appeared to learn to read faster with the I.T.A., these initial gains were lost when the child had to change to the traditional alphabet, eliminating the unique symbols. Transferring their knowledge to the standard alphabet was difficult.

What is needed is a modified alphabet for education that is not different from the traditional one, but rather one that emphasizes the traditional alphabet's sounds and visual forms. An initial suggestion for the modified alphabet was published by the present inventor in the *Journal of Educational Technology Systems*, 18, 173–183 which is incorporated herein as a whole by reference.

In view of the prior art considered as a whole at the time the present invention was made, it was not obvious to those of ordinary skill in the pertinent art how the identified need could be fulfilled.

SUMMARY OF INVENTION

This invention is designed to help teach beginner reading. Conclusive research indicates that the most critical hurdle to effective reading is learning the correct connections between symbols (letters) and their sounds (pronunciations). To learn this, children must learn that words (e.g., /cat/) are composed of distinct sounds (/c/, /a/, /t/), and they must learn to hear those sounds.

The present invention provides for the creation of a Dynamic Alphabet. The Dynamic Alphabet makes the connection between individual letters and sounds clear and explicit. The Dynamic Alphabet uses a visual analogy between letters and the mouth to link pronunciation cues with the visual structure of letters. These links become real and salient through animation. The Dynamic Alphabet involves two main innovations, pronunciation cues and real-time animation. In the Dynamic Alphabet of the present invention, each letter is treated as a mouth with air flowing through it, as during speech. The pronunciation cues show how the letter's sound or sounds are formed. Because these cues are incorporated into the letter's visual structure, the letters of the alphabet are emphasized at all times. The Dynamic Alphabet uses a visual analogy between letters and the vocal tract. For each letter, a critical vocal part is mapped onto its form.

The Dynamic Alphabet cues come to life in real-time animation. Children see a Dynamic Alphabet letter in action as they hear the sound. Thus, the individual sounds of a word become salient, as do the individual letters and the letter-sound correspondence.

The Dynamic Alphabet incorporates these critical properties into a comprehensive system. A set of cues is used to indicate every typical letter-sound in the English language. These cues can be faded out and removed as children progress. For some children, additional cues can be added. Letters can be presented and taught individually, in letter clusters (e.g., onsets and rimes), in words, in stories, and with pictures. Children and teachers are invited to write their own materials.

In addition, note that the Dynamic Alphabet can be useful in teaching second languages. The Dynamic Alphabet illustrates how sounds differ in a new language while emphasizing the letters and spellings of that language.

The present invention provides for a method of associating visual symbols with verbal expression comprising the steps of, preselecting a language having both verbal and written expressions, establishing an array of sounds employed in the verbal expression of the language, assembling an array of symbols correlating to the array of sounds according to the language, associating a mechanical physiologic cue with each sound in the array of sounds, and visually presenting the array of symbols enhanced with the mechanical physiologic cue associated with each sound. With this method the symbols used to identify the sounds associated with a language are modified by associating a mechanical physiologic cue with each identifiable sound. The method described can be further enhanced by animating the array of symbols according to the mechanical physiologic cue associated with each sound.

In a preferred embodiment, the preselected language of the present invention comprises written symbols corresponding to individual sounds or phonemes.

In a preferred embodiment, the present invention provides a method of associating letters of an alphabet with verbal expression of a language, comprising the steps of, establishing an array of sounds employed in the verbal expression of the language, selecting a mechanism of speech production for each sound which can be indicated visually, as a pronunciation cue, and modifying the written letters to incorporate the pronunciation cues, whereby the pronunciation cues identify the mechanism of speech production in the context of the verbal expression of the language.

In an additional preferred embodiment, the pronunciation cues are animated.

In yet another embodiment, the method of the present invention includes a plurality of pronunciation cues to identify the sounds of the language. The pronunciation cues include, but are not limited to, a lips cue identifying the position of the lips during the production of the sound, a throat closure clue identifying the status of the throat during the production of the sound, a tongue cue identifying the position of the tongue during the production of the sound, a vibration cue identifying a nasal vibration present during the production of the sound, a teeth clue identifying the involvement of the teeth in the production of the sound, an expelled air clue identifying the air exiting the mouth during production of the sound, a vowel shape modifier, wherein the vowel shape modifier identifies a long vowel sound by elongating the letter exhibiting a long vowel sound and a short vowel sound by shortening the letter exhibiting a short vowel sound, and a silent letter clue, whereby the silent letter clue modifies the letter associated with a silent sound to be a lighter shade than the letters associated with a non-silent sound.

In an additional embodiment, an apparatus is provided for associating visual symbols with verbal expression, the apparatus comprising, a language having both verbal and written expression, an established array of sounds employed in the verbal expression of the language, an array of symbols correlating to the array of sounds according to the language, a mechanical physiologic cue associated with each sound in the array of sounds, and a visual representation of the array of symbols enhanced with the mechanical physiologic cues associated with each sound.

In another embodiment, the apparatus further comprises an animated representation of the array of symbols according to the mechanical physiologic cues associated with each sound identified in the language.

In an additional embodiment, an apparatus is provided for associating letters of an alphabet with verbal expression of a language. The apparatus comprises, an array of sounds employed in the verbal expression of the language, an array of pronunciation cues, whereby each pronunciation cue visually indicates a mechanism of speech production associated with the array of sounds, modified written letters incorporating the pronunciation cues, whereby the pronunciation cues identify the mechanism of speech production in the context of the verbal expression of the language.

In another embodiment, the apparatus further comprises an animated representation of the pronunciation cues.

In an additional embodiment, a processor readable storage medium containing processor readable code for programming a processor to perform a method of associating visual symbols with verbal expression is provided, the steps performed by the processor comprising, preselecting a language having both verbal and written expressions, establishing an array of sounds employed in the verbal expression of the language, assembling an array of symbols correlating to the array of sounds according to the language, associating a mechanical physiologic cue with each sound in the array of sounds, visually presenting the array of symbols enhanced with the mechanical physiologic cue associated with each sound, and animating the array of symbols according to the mechanical physiologic cue associated with each sound.

In yet another embodiment of the invention, a processor readable storage medium containing processor readable code for programming a processor to perform a method of associating letters of an alphabet with verbal expression of a language is provided, the steps performed comprising, establishing an array of sounds employed in the verbal expression of the language, selecting a mechanism of speech production for each sound which can be indicated visually, as a pronunciation cue, modifying the written letters to incorporate the pronunciation cues, whereby the pronunciation cues Identify the mechanism of speech production in the context of the verbal expression of the language, and animating the pronunciation cues.

In an additional embodiment, the visual presentation provided by the pronunciation cues is enhanced by an audible presentation according to the pronunciation cues. With this method, the student will be provided both a visual presentation and an audible presentation of the sounds.

These and other important objects, advantages, and features of the invention will become clear as this description proceeds.

The invention accordingly comprises the features of construction, combination of elements, and arrangement of parts that will be exemplified in the description set forth hereinafter and the scope of the invention will be indicated in the claims.

BRIEF DESCRIPTION OF DRAWINGS

For a fuller understanding of the nature and objects of the invention, reference should be made to the following detailed description, taken in connection with the accompanying drawings, in which:

FIGS. 14 and 15 are tables illustrating the association of letters/sounds, cues and diagraphs;

DETAILED DESCRIPTION

Figure 1:
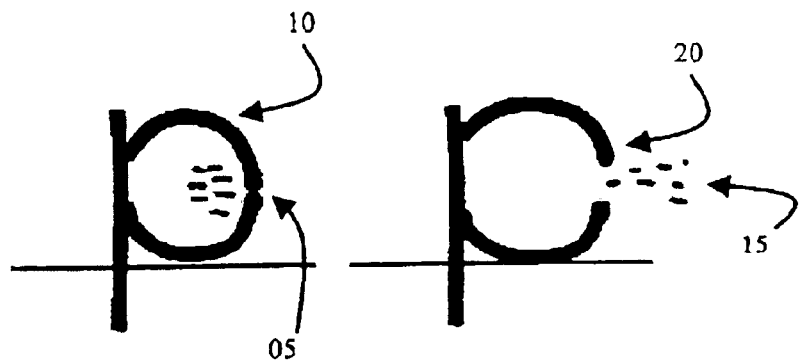
FIG. 1 shows static cues first, followed by the animation frame.

Referring now to FIG. 1, which illustrates the appropriate pronunciation cues, mapped to the letter "p" 10. The static pronunciation cue for the sound of the letter "p" is the closed lips 5. The pronunciation cue indicates that the lips are closed when verbally producing the sound of the letter "p". It is within the scope of the invention to further enhance the pronunciation cue by coloring the portion of the letter presenting the lips cue. In a preferred embodiment, the lips cue portion of the letter would be enhanced with a typical lip color. When animation is added, as in 20, it is shown that the sound of the letter "p" is produced by holding air and then releasing it 15.

Figure 2:
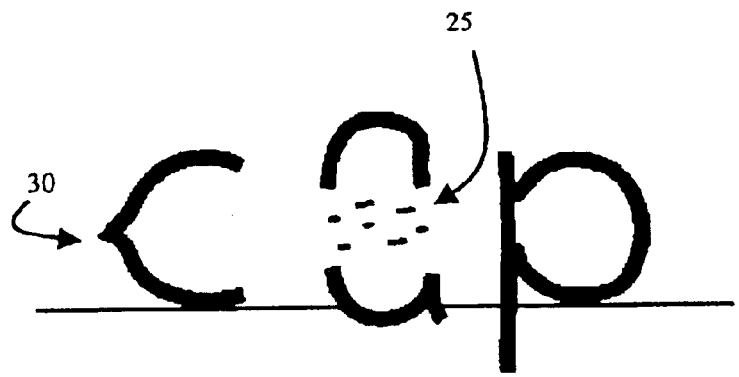
FIG. 2 shows the middle frame for cap.

FIG. 2 illustrates two pronunciation cues for the word "cap". Air is shown flowing through the letter (mouth) 25 to make the short-a sound. Note also that the hard "c" sound in the word "cap" is cued by the constricted back of the letter 30 to indicate the constriction in the back of the throat when producing the hard "c" sound.

Figure 3:
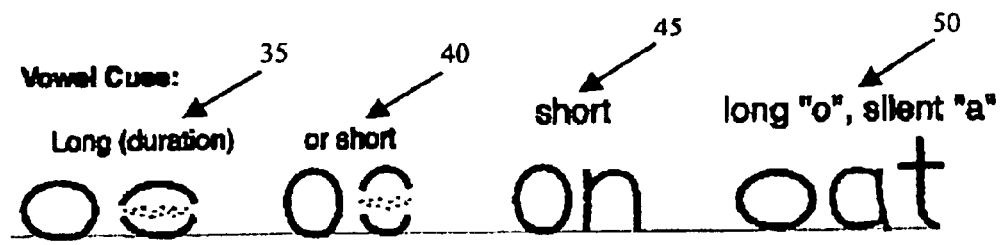
FIG. 3 illustrates vowel cues.

FIG. 3 illustrates the vowel pronunciation cues. The application of the pronunciation cue for a long vowel elongates the shape of the letter and animates with air passing through the letter 35 as air is exhaled during the verbal pronunciation of the letter sound. The application of the pronunciation cue for a short vowel sound shortens the shape of the letter and animates with air passing through the letter 40 as air is exhaled during the verbal pronunciation of the letter sound. An example of a short "o" sound according to the present invention is shown as in 45. An example of a long "o" sound and a silent "a" according to the present invention are as shown in 50. The pronunciation cue as shown for a silent letter serves to lighten the letter with respect to the other written letters.

Figure 4:
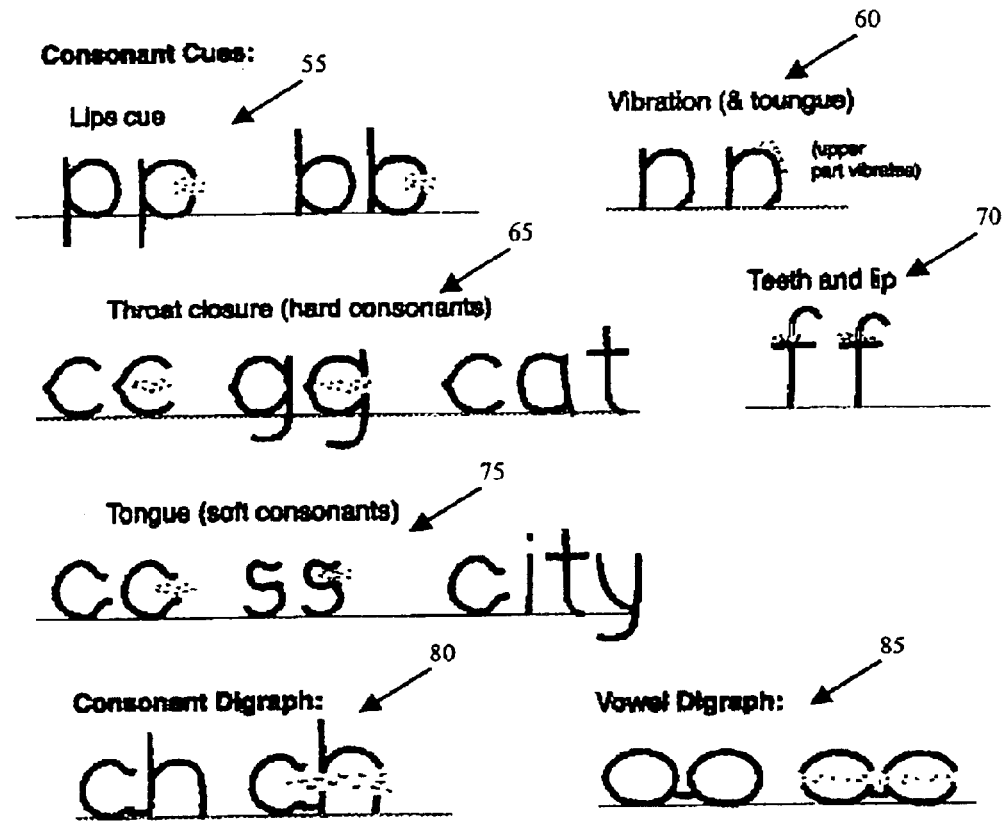
FIG. 4 illustrates consonant cues.

FIG. 4 illustrates consonant pronunciation cues. The lips cue 55 operates on the letters "p" and "b" as they are shown cued by a closed lip in a static presentation and by air being exhaled in the animated presentation. The vibration and tongue pronunciation cues are illustrated as in 60 as they operate on the letter "n". The throat closure pronunciation cue used for hard consonants is illustrated as in 65. The teeth and lip pronunciation cues are illustrated in 70 as they operate on the letter "f". The tongue pronunciation cue used for soft consonants is illustrated as in 75. The pronunciation cue then operates on the digraph in combination as shown for the digraph "ch" 80. A similar situation exists for a vowel digraph as in "oo" 85, wherein the pronunciation cue operates on the digraph as a single sound.

Figure 5:
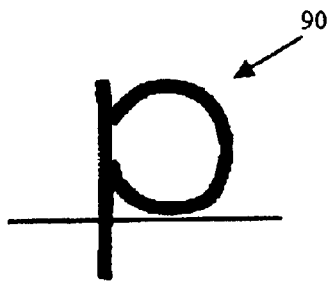
FIG. 5 illustrates the letter "p" at rest.
Figure 6:
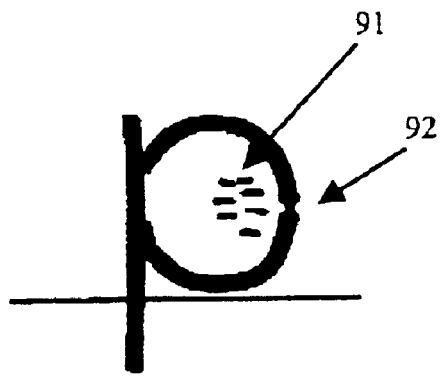
FIG. 6 illustrates the letter "p" animated with lip-closure and pressure.
Figure 7:
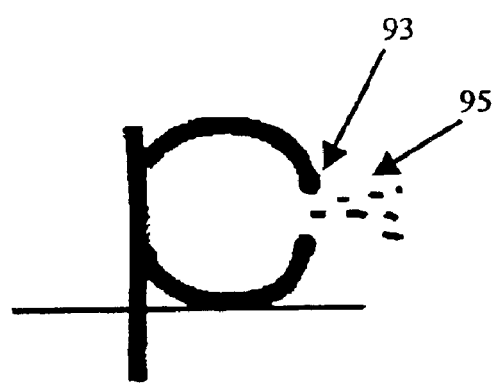
FIG. 7 illustrates the letter "p" animated with open lips and release of pressure.

FIG. 5 illustrates the letter "p" at rest 90. FIG. 6 illustrates the letter "p" animated with the lip closure pronunciation cue 92 and the pressure of air behind the lips 91. FIG. 7 illustrates the letter "p" animated with open lips 93 and the release of air 95.

Figure 8:
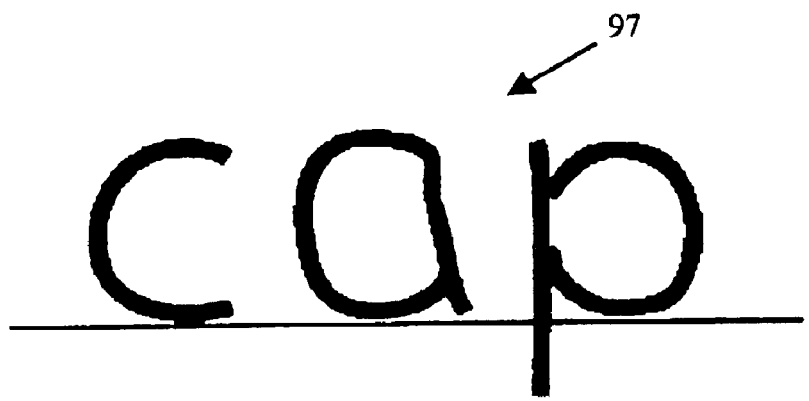
FIG. 8 illustrates the word "cap" at rest.
Figure 9:
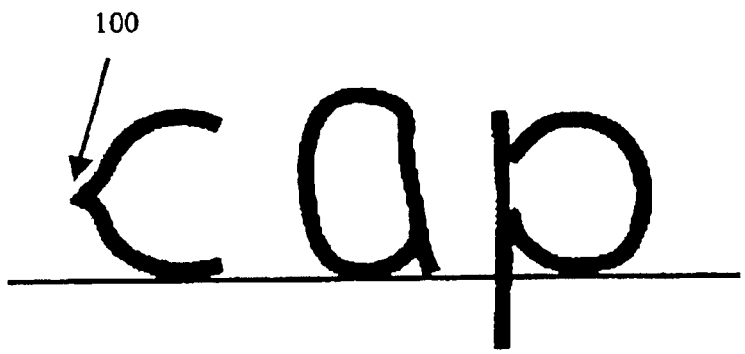
FIG. 9 illustrates the word "cap" with the static cue for "c"
Figure 10:
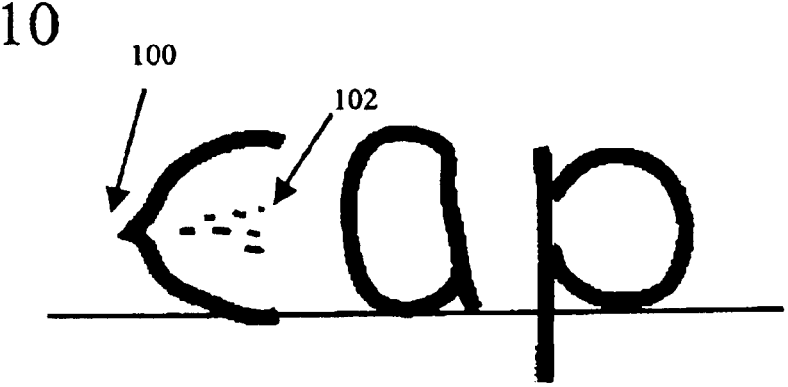
FIG. 10 illustrates the word "cap" with the "c" consonant animated.
Figure 11:
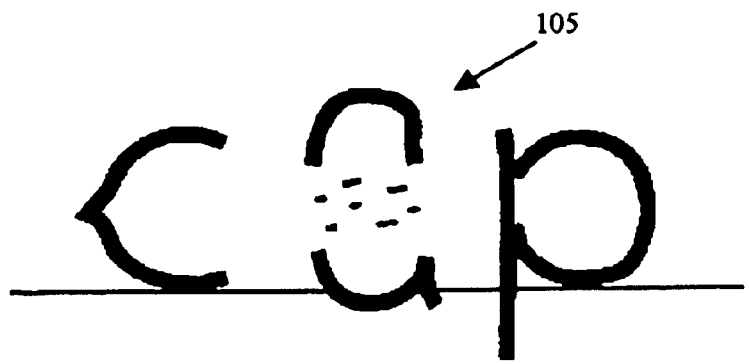
FIG. 11 illustrates the word "cap" with the "a" vowel animated.
Figure 12:
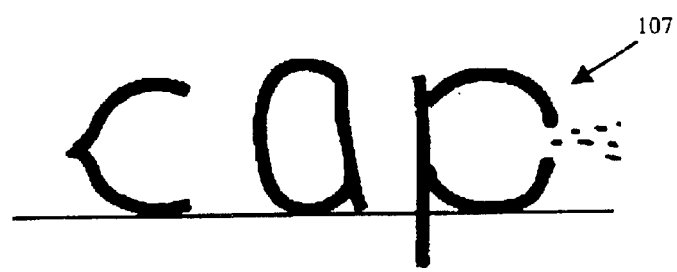
FIG. 12 illustrates the word "cap" with the "p" consonant animated.

FIG. 8 illustrates the word "cap" at rest 97. FIG. 9 illustrates the word "cap" with the "c" consonant exhibiting the throat closure pronunciation cue 100. FIG. 10 illustrates the word "cap" with the "c" consonant animated with the throat closure pronunciation cue 100 and the exhalation of air 102. FIG. 11 illustrates the word "cap" with the "a" vowel animated with the short vowel pronunciation cue and air flowing through the vowel 105. FIG. 12 illustrates the word "cap" with the "p" consonant animated with the pronunciations cues are for the letter "p" as previously described 107.

Figure 13:
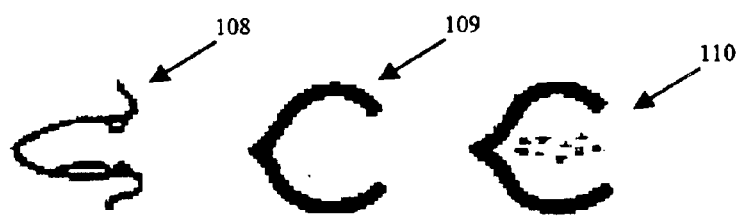
FIG. 13 illustrates the physiological analogy of the invention.

The present invention uses an analogy between mouth and letters. Cues show main articulatory mechanisms for consonants; for vowels, an "open mouth" is shown and vowel is long or short. As shown in FIG. 13, the positioning of the mouth used to produce the letter "c" is shown 108 and this mechanism to produce the desired sound is mapped onto the letter itself as in the throat closure 109 and the exhalation of air 110.

In an implementation of the invention, typically letters are shown in two-frame animations; the first frame is normal, minimal-cue mode used with words; the second frame shows the sound being produced through animation. With this method, letters and words are first presented to children without cues, because the cues may not be needed. If a child can't pronounce the text, static cues can be presented, to remind the child of the pronunciation. If this is also difficult, the animation can be presented to show how letters are pronounced.

According to the present invention, all letters have an "air" cue except silent letters. With consonants, air comes out during animation. With vowels, air flows through during animation. The letterforms come to life because the computer presents the sound while the visual animation shows how the sound is produced, through subtle movements and the flow of air. When words are shown, individual letters become active as their sound is produced; creating an interesting audio-visual event that is highly relevant to learning.

As shown in FIGS. 14 and 15, a set of cues is used to indicate every typical letter-sound in the English language. These cues can be faded out and removed as children progress. For some children, additional cues can be added. Letters can be presented and taught individually, in letter clusters (e.g., onsets and rimes), in words, in stories, and with pictures. It is within the scope of the present invention to allow children and teachers to incorporate additional sounds and pronunciation cues as necessary.

Figure 16:
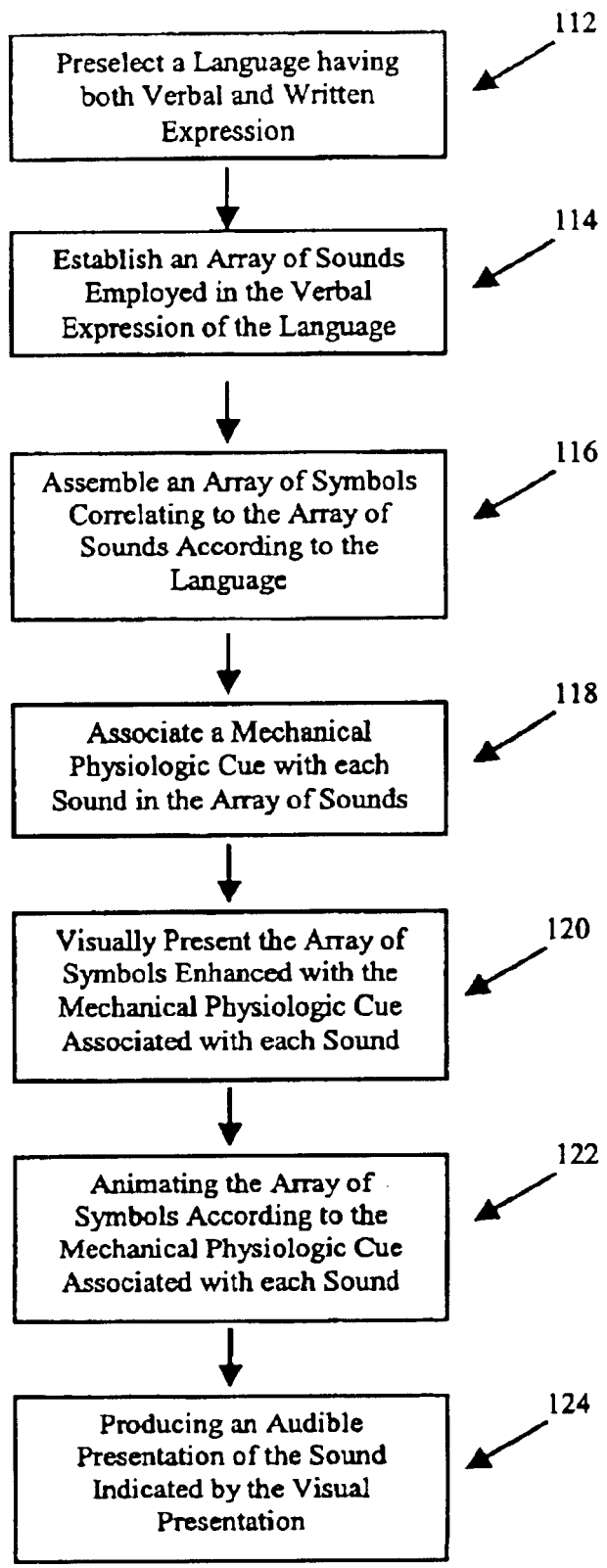
FIG. 16 is a flowchart of the present invention.

FIG. 16 illustrates the process steps associated with the present invention. As shown, a language is preselected having both a verbal and written expression 112. An array of sounds employed in the verbal expression of the language is established 114. An array of symbols correlating to the array of sounds according to the language is assembled 116. A mechanical physiologic cue is associated with each sound in the array of sounds 118. The array of symbols enhanced with the mechanical physiologic cue associated with each sounds is presented 120. The array of symbols are animated according to the mechanical physiologic cues 122. An audible presentation of the sound illustrated by the visual presentation is produced 124.

Figure 17:
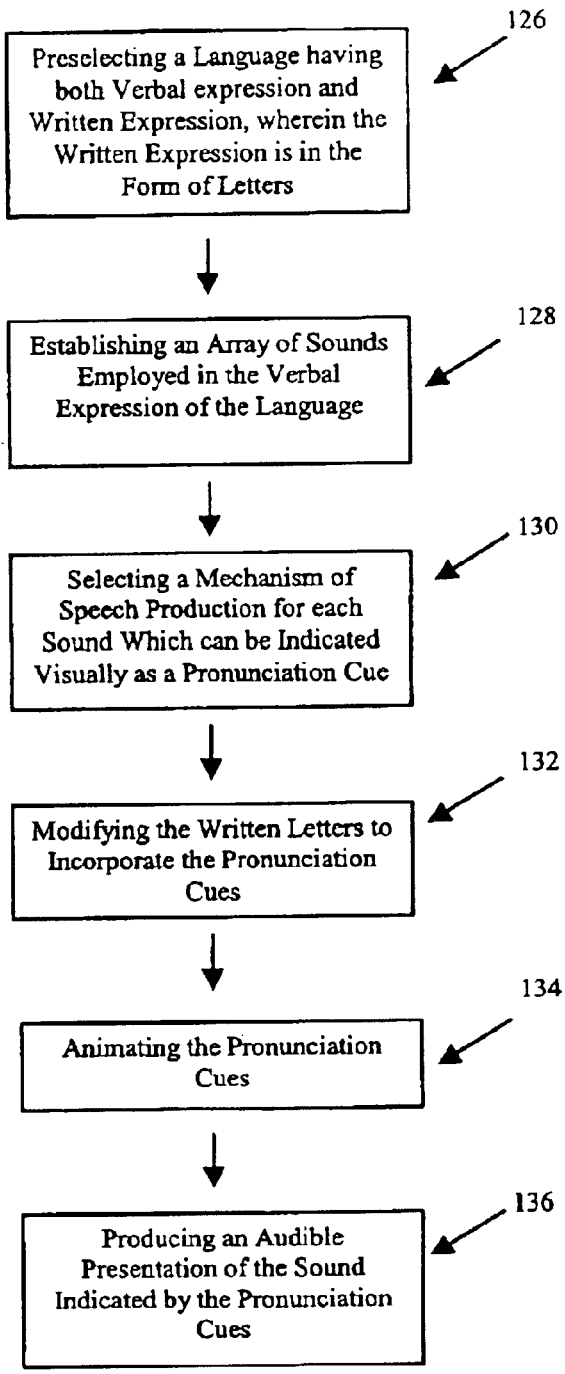
FIG. 17 is a flowchart of the present invention, wherein the written language consists of letters of an alphabet.

FIG. 17 illustrates the method of the present invention as it relates to a written language employing an alphabet of letters. As shown, a language is preselected having both a verbal and written expression, wherein the written expression is in the form of letters 126. An array of sounds employed in the verbal expression of the language is established 128. A mechanism of speech production for each sound indicated by a pronunciation cue is selected 130. The written letters are modified to incorporate the pronunciation cue 132. The pronunciation cues are animated 134. An audible presentation according to the pronunciation cues is produced 136.

It will be seen that the objects set forth above, and those made apparent from the foregoing description, are efficiently attained and since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween. Now that the invention has been described,

What is claimed is:

1. A method of associating computer animated visual symbols with verbal expression comprising the steps of:

preselecting a language having both verbal and written expressions;

establishing an array of sounds employed in the verbal expression of the language;

assembling an array of symbols correlating to the array of sounds according to the language;

associating a mechanical physiologic cue with each sound in the array of sounds;

visually presenting the array of symbols enhanced with the mechanical physiologic cue associated with each sound;

displaying a plurality of artificial moving images simulating the mechanism of speech production related to movements associated with a mouth as directed by the array of symbols, wherein the display of the plurality of artificial moving images is effective in teaching an individual to read.

2. The method of claim 1, further comprising the step of, producing an audible presentation of the sound indicated by the visual presentation.

3. The method of claim 1 wherein the preselected language further comprises written symbols corresponding to individual sounds.

4. The method of claim 1 wherein the preselected language further comprises written symbols corresponding to individual phonemes.

5. A method of associating letters of an alphabet with verbal expression of a language, comprising the steps of:

preselecting a language having both verbal expression and written expression, wherein the written expression is in the form of letters;

establishing an array of sounds employed in the verbal expression of the language;

selecting a mechanism of speech production for each sound which can be indicated visually, as a pronunciation cue;

modifying the written letters to incorporate the pronunciation cues, whereby the pronunciation cues identify the mechanism of speech production in the context of the verbal expression of the language; and visually displaying a plurality of artificial moving images simulating the mechanism of speech production related to movements associated with a mouth as directed by the pronunciation cues, wherein the display of the plurality of artificial moving images is effective in teaching an individual to read.

6. The method of claim 5, further comprising the step of producing an audible presentation of the sound indicated by the pronunciation cue.

7. The method of claim 5, whereby the mechanism of speech production is a lip position and the pronunciation cue is a lips cue.

8. The method of claim 5, whereby the mechanism of speech production is a throat position and the pronunciation cue is a throat closure cue.

9. The method of claim 5, whereby the mechanism of speech production is a tongue position and the pronunciation cue is a tongue cue.

10. The method of claim 5, whereby the mechanism of speech production is a nasal vibration and the pronunciation cue is a vibration cue.

11. The method of claim 5, whereby the mechanism of speech production is a teeth position and the pronunciation cue is a teeth clue.

12. The method of claim 5, whereby the mechanism of speech production is expelled air and the pronunciation cue is an expelled air clue.

13. The method of claim 5, whereby the pronunciation cues further comprise a vowel shape modifier.

14. The method of claim 13, wherein the vowel shape modifier identifies a long vowel sound by elongating the letter exhibiting a long vowel sound.

15. The method of claim 13, wherein the vowel shape modifier identifies a short vowel sound by shortening the letter exhibiting a short vowel sound.

16. The method of claim 5, whereby the pronunciation cues further comprise a silent letter clue.

17. The method of claim 16, whereby the silent letter clue modifies the letter associated with a silent sound to be a lighter shade than the letters associated with a non-silent sound.

18. A method of associating letters of an alphabet with verbal expression of a language, comprising the steps of:

preselecting a language having both verbal expression and written expression, wherein the written expression is in the form of letters;

establishing an array of sounds employed in the verbal expression of the language;

selecting a mechanism of speech production for each sound which can be indicated visually, as a pronunciation cue;

modifying the written letter to incorporate the pronunciation cues, whereby the pronunciation cues identify the mechanism of speech production in the context of the verbal expression of the language and are selected from a group;

visually displaying a plurality of artificial moving images simulating the mechanism of speech production related to movements associated with a mouth as directed by the pronunciation cues, wherein the visual display of the plurality of artificial moving images is effective in teaching an individual to read;

producing an audible presentation of the sound indicated by the pronunciation cues;

representing a lip position mechanism of speech production with a lips cue;

representing a throat position mechanism of speech production with a throat closure clue;

representing a tongue position mechanism of speech production with a tongue clue;

representing a nasal vibration position mechanism of speech production with a vibration cue;

representing a teeth position mechanism of speech production with a teeth clue;

representing an expelled air mechanism of speech production with an expelled air clue;

representing a long vowel sound by elongating the letter exhibiting the long vowel sound;

representing a short vowel sound by shortening the letter exhibiting the short vowel sound; and representing a silent sound by presenting the silent letter as a lighter shade than the non-silent sounds.

* * * * *